United States Patent
Diehl et al.

(10) Patent No.: US 7,403,622 B2
(45) Date of Patent: Jul. 22, 2008

(54) PROCESS FOR MANAGING A SYMMETRIC KEY IN A COMMUNICATION NETWORK AND DEVICES FOR THE IMPLEMENTATION OF THIS PROCESS

(75) Inventors: Eric Diehl, Liffré (FR); Jean-Pierre Andreaux, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 727 days.

(21) Appl. No.: 10/125,207

(22) Filed: Apr. 18, 2002

(65) Prior Publication Data
US 2003/0108206 A1  Jun. 12, 2003

(30) Foreign Application Priority Data
Apr. 25, 2001 (FR) .................................. 01 05568

(51) Int. Cl.
*H04N 7/167* (2006.01)
*H04L 9/00* (2006.01)
*H04K 1/00* (2006.01)

(52) U.S. Cl. .................. 380/278; 380/241; 380/259; 380/281; 380/284; 380/271; 380/205; 380/210; 380/277

(58) Field of Classification Search ................ 380/277, 380/278, 259, 281, 284, 271, 205, 210, 241
See application file for complete search history.

(56) References Cited

U.S. PATENT DOCUMENTS

| 4,736,422 | A | * | 4/1988 | Mason ..................... 380/228 |
| 5,479,514 | A | * | 12/1995 | Klonowski ................ 380/47 |
| 5,666,411 | A | * | 9/1997 | McCarty .................... 705/51 |
| 6,049,878 | A | * | 4/2000 | Caronni et al. ............. 726/3 |
| 6,195,751 | B1 | * | 2/2001 | Caronni et al. ............. 713/163 |
| 6,330,671 | B1 | * | 12/2001 | Aziz ........................ 713/163 |

(Continued)

FOREIGN PATENT DOCUMENTS

EP  0 669 741 A2  8/1995

(Continued)

OTHER PUBLICATIONS

Schneier, Bruce, "Applied Cryptography: Protocols, Algorithms, and Source Code in C," 1996, John Wiley and Songs, Inc, Second Edition, pp. 516-517.*

*Primary Examiner*—Kaveh Abrishamkar
(74) *Attorney, Agent, or Firm*—Joseph J. Laks; Paul P. Kiel

(57) ABSTRACT

A symmetric key management process in a communication network comprising a source device furnished with a source of data to be broadcast over the network and at least one receiver device intended to receive the broadcast data. The process comprises: determining and securely transmitting a first symmetric key to a receiver device; the receiver device encrypting the first symmetric key using a second symmetric key and transmitting it to the source device; and the source device recovering and storing it. Before transmitting the data to at least one reception device, the source device encrypts these data with the aid of the first symmetric key, then it transmits these encrypted data, accompanied by the first encrypted symmetric key, to at least one receiver device. The receiver device decrypts the first symmetric key with the aid of the second key which it possesses, then it decrypts the encrypted data with the aid of the first symmetric key thus recovered.

15 Claims, 4 Drawing Sheets

U.S. PATENT DOCUMENTS

| | | | |
|---|---|---|---|
| 6,714,649 B1 * | 3/2004 | Masuda et al. | 380/44 |
| 6,804,357 B1 * | 10/2004 | Ikonen et al. | 380/241 |
| 6,813,357 B1 | 11/2004 | Matsuzaki et al. | |
| 7,020,282 B1 * | 3/2006 | Chang | 380/44 |
| 7,039,803 B2 * | 5/2006 | Lotspiech et al. | 713/163 |
| 7,149,308 B1 * | 12/2006 | Fruehauf et al. | 380/44 |
| 2002/0104001 A1 * | 8/2002 | Lotspiech et al. | 713/163 |
| 2002/0118838 A1 * | 8/2002 | Belenko et al. | 380/277 |
| 2002/0162104 A1 * | 10/2002 | Raike et al. | 725/31 |
| 2002/0170054 A1 * | 11/2002 | Kudelski et al. | 725/31 |
| 2003/0195855 A1 * | 10/2003 | Parks et al. | 705/51 |

FOREIGN PATENT DOCUMENTS

| | | |
|---|---|---|
| EP | 0669741 A3 | 10/1999 |
| JP | 10-190646 | 7/1998 |
| JP | 2000-261425 | 9/2000 |
| JP | 2001-69480 | 3/2001 |

* cited by examiner

PROCESS FOR MANAGING A SYMMETRIC KEY IN A COMMUNICATION NETWORK AND DEVICES FOR THE IMPLEMENTATION OF THIS PROCESS

FIELD OF THE INVENTION

The present invention relates in a general manner to the field of local digital networks and more particularly to the field of digital home networks.

BACKGROUND ART

Such a network consists of a collection of devices linked together by a digital bus, for example a bus according to the IEEE 1394 standard. It comprises in particular two types of device:
  Source devices capable of transmitting data over the network: these devices can recover the data through a "channel" external to the network.
  Receiver devices, suitable for receiving the data flowing over the network, so as to process them or present them to the user.

Thus, taking the example of a digital home network intended for conveying audio and/or video data into various rooms of a house, the source devices are, for example, digital decoders receiving video programmes from outside the network, via a satellite antenna or via a cable connection, or else optical disc readers broadcasting over the network, in digital form, data (audio and/or video) read from a disc (in this case the disc contains data originating from outside the network). The receiver devices are, for example, television receivers making it possible to view video programmes received from the network or, more generally, any type of appliance having the capacity to decrypt encrypted data.

From the standpoint of content providers who provide the data originating from outside the local network, in particular service providers broadcasting pay-per-view televised programmes or else optical disc publishers for example, it is necessary to prevent these transmitted data from being copied and from flowing easily (for example by being copied onto an optical disc or any other recording medium) from one local network to another.

To do this, it is known practice to transmit the data in secret form by encrypting them with the aid of cryptography algorithms using keys which are known beforehand to the appliances authorized to receive these data or else which are exchanged according to particular secure protocols between the content provider and these appliances.

PCT patent application WO 00/62505 in the name of THOMSON Multimedia, filed on 31 Mar. 2000 and claiming the priority of a French patent application in the name of the same applicant, filed on 13 Apr. 1999 and published under the reference FR 2792482, relates to a domestic network in which a public key specific to the network is used to encrypt the data flowing between appliances of the network, typically from the previously mentioned source devices to receiver devices. Only the appliances of this network possess the private key corresponding to the public key. The (public key, private key) pair being specific to the network, data encrypted within the framework of this network cannot be decrypted by appliances of another network.

The use of a pair of asymmetric keys has certain advantages, but also some drawbacks. One of the main advantages is that no secret is stored in the source appliances: these appliances are aware of the public key, but not the private key. However, the implementation of asymmetric keys is relatively slow, as compared with that of symmetric keys. Moreover, the lifetime of asymmetric keys is short, requiring periodic revocation and the creation of new keys. In this case, data encrypted with a key and then recorded might suddenly no longer be decryptable on the network. Moreover, a sizeable number of pairs of asymmetric keys is necessary.

One would then be tempted to implement a symmetric key to encrypt the data. However, this would require the source devices to be aware of this key, and this would impose increased security constraints on them and consequently render them more expensive.

SUMMARY OF THE INVENTION

The subject of the invention is a process of symmetric key management in a communication network comprising a device of a first type furnished with a source of data to be broadcast over the network and at least one device of a second type intended to receive said data. The process comprises the steps of:
  (a) by the device of the first type, determination of a first symmetric key and transmission of the first key in a secure manner to at least one device of the second type;
  (b) by at least one device of the second type, reception of the first symmetric key, encryption of the first symmetric key with the aid of a second symmetric key, known to the devices of the second type of the network and transmission of the result of this encryption to the device of the first type;
  (c) by the device of the first type, recovery and storage of the encryption of the first symmetric key.

When the device of the first type has to transmit data to at least one device of the second type, the process continues via the steps of:
  (d) by the device of the first type, encryption with the aid of the first symmetric key, of data to be transmitted to at least one device of the second type;
  (e) by the device of the first type, transmission of the encrypted data and of the first encrypted symmetric key to at least one device of the second type; and
  (f) by at least one device of the second type, decryption of the first symmetric key encrypted by at least one device of the second type with the aid of the second symmetric key and decryption of the encrypted data with the aid of the first symmetric key thus recovered.

Thus, the encryption of the data to be transmitted from the appliance of the first type, typically an accessway to the network such as a satellite receiver/decoder, to an appliance of a second type, typically a display device, is achieved with the aid of a symmetric key (the first key mentioned above).

The transmission of this first key is carried out in an encrypted manner with the aid of a second key, which, according to the preferred embodiment, is also symmetric.

Symmetric keys being shorter than asymmetric keys, memory space is saved. Moreover, symmetric algorithms are faster than asymmetric algorithms: less computational power is necessary. Nevertheless, no long-term secret (typically the second key) is stored in the device of the first type. This device possesses only the first key, which it is easy to change frequently, as a function of the applications envisaged, in real time and in a manner which is transparent as regards the user.

Moreover, the first and second keys, insofar as they are symmetric, can be chosen randomly, and do not require certification by a third-party authority, thereby reducing the costs.

The encrypted recorded data (the scrambler control words according to the non-limiting exemplary embodiment) are so with the aid of a symmetric key, which does not possess any preprogrammed expiry date. There is therefore no danger of the first encryption key no longer being available during playback: the latter can be stored, itself encrypted with the aid of the second key, together with the data concerned.

According to a particular embodiment, the device of the first type stores in parallel a plurality of first non-encrypted symmetric keys and of first encrypted symmetric keys corresponding to the non-encrypted keys. Specifically, this allows the device of the first type to predict the moments at which one or more devices of the second type are off or otherwise unavailable and during which a new first symmetric key cannot be generated. The device of the first type thus has available a plurality of first keys, created in advance, which it can use one after another, even in the event of the unavailability of appliances of the second type on the network. Specifically, the encrypted data may very well be intended for an appliance of a third type (for example a recording device).

According to a particular embodiment, the first symmetric key is renewed at least during the transmission of a new series of data, or several times during the transmission of a series of data. Depending on the security required, that is to say depending on the application envisaged, the first symmetric key is renewed more or less frequently.

According to a particular embodiment, the inventive process furthermore comprises a phase of installation of a new device of the second type in the network, the phase of installation comprising the step of verification of the presence of a device of the second type pre-existing in the network, possessing the second symmetric key and having the capacity to transmit it securely and, in the affirmative, the step of transmission of the second symmetric key to the new device of the second type, and, in the negative, the step of generation of the second symmetric key by the new device of the second type.

The installation phase is aimed at communicating the second symmetric key, also called the network key, to all the receivers of the network.

The subject of the invention is also a communication device suitable for being connected to a communication network, the device comprising:
  means of encryption of data which deploy an encryption algorithm implementing a first symmetric key;
  a memory comprising the first symmetric key encrypted with the aid of a second key known to at least one receiver device linked to the network; and
  means of transmission over the network of the data encrypted with the aid of the encryption means.

Preferably, the second key is also a symmetric key.

According to a particular embodiment, the data to be encrypted by the communication device above are initially unencrypted.

According to a particular embodiment, the data to be encrypted by the communication device are initially encrypted, but decrypted by the device so as to be encrypted again in the manner indicated. For this purpose, the device has available means of decryption of data originating from a source of encrypted data. This source may be, by way of example, a satellite, terrestrial or cable television network, in which the data flow in an encrypted manner.

According to another particular embodiment, the data to be encrypted by the communication device are initially encrypted, then encrypted once more in the manner indicated.

The preferred embodiment is, however, that where the data are decrypted before being again encrypted before they are fed into the network.

According to another particular embodiment, the means of encryption are provided so as to renew the first symmetric key frequently.

The subject of the invention is also a device for processing data in a communication network, which comprises:
  means of decryption of a first symmetric key received in an encrypted manner from an appliance of the network, the encryption of the first symmetric key having been carried out with the aid of a second symmetric key;
  a memory for containing the second symmetric key common to all the appliances of a given type of the network; and
  means of decryption of encrypted data received from the network with the aid of the first symmetric key.

According to the exemplary embodiment, the said device comprises means for descrambling data received from the network, the descrambling means using the result of the data decryption carried out with the aid of the first symmetric key.

According to a particular embodiment, the memory containing the second symmetric key furthermore comprises a pair of asymmetric keys used for the secure transmission, to the said processing device, of the first symmetric key. The processing device furthermore comprises means of encryption of the first symmetric key with the aid of the second symmetric key for return to the appliance of the network having transmitted the first symmetric key.

BRIEF DESCRIPTION OF THE DRAWINGS

Other characteristics and advantages of the invention will become apparent through the description of a particular non-limiting exemplary embodiment made explicit with the aid of the attached Figures, among which.

DETAILED DESCRIPTION OF AN EMBODIMENT OF THE INVENTION

An exemplary communication network will firstly be described in order to illustrate the way in which data and various keys are exchanged. Subsequently, the creation and the transmission of each type of key, be it within the framework of the installation of a receiver device into the network or of a data transmission between a source device and a receiver device, will be described in greater detail.

I] Description of the Network

Figure 1:
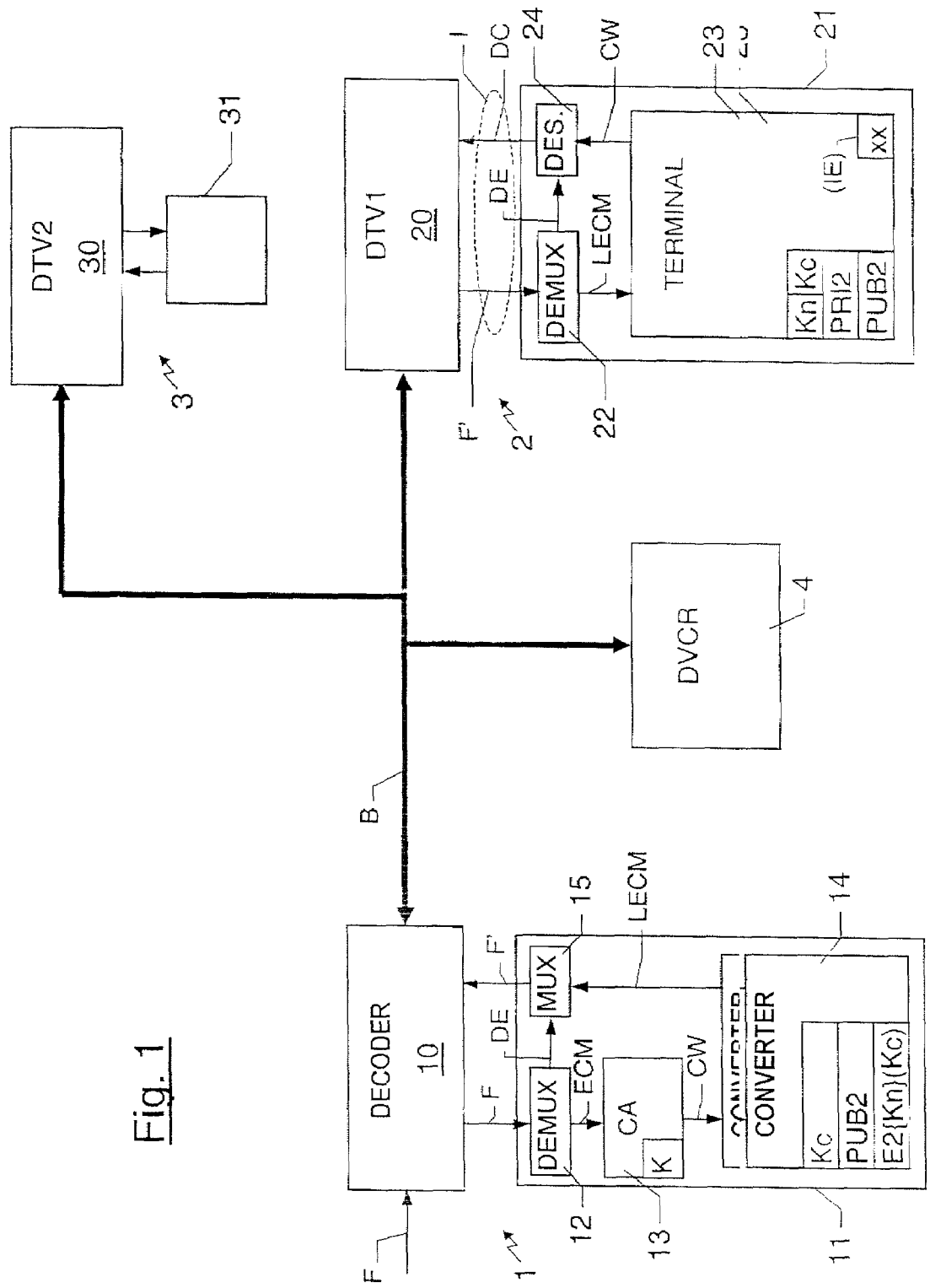
FIG. 1 is a block diagram of a communication network linking several appliances implementing the process of the invention according to the exemplary embodiment.

Represented in FIG. 1 is a digital home network comprising a source device 1, two receiver devices 2 and 3 and a digital video recorder 4, commonly referred to as a DVCR (DVCR standing for "Digital Video Cassette Recorder"). The collection of devices 1, 2, 3 and 4 is plugged into a domestic digital bus B which is, for example, a bus according to the IEEE 1394 standard.

The source device 1 comprises a digital decoder 10 fitted with a chip card reader furnished with a chip card 11. This digital decoder 10 is, in particular, plugged into a satellite antenna or into a cable network for receiving video programmes distributed by a service provider. These programmes are received in a data stream F, for example in the MPEG-2 format. In a manner known per se, they are transmitted in a form scrambled by control words CW, these control words being themselves transmitted, in the data stream F, in a form encrypted with the aid of a key K according to a given encryption algorithm so as to remain secret during transmission.

Thus, only users authorized by the service provider are permitted to descramble the transmitted data (against payment of a subscription, for example). To do this, the provider supplies the authorized users with the key K serving to decrypt the control words CW. Often, the authorization to receive the programmes is only temporary, while the user pays his subscription. The key K is therefore regularly modified by the service provider.

By virtue of the invention, and as will be seen hereinbelow, the user will nevertheless be able to record programmes transmitted while he is a subscriber and to play them back as many times as he wishes onto his own network, even when the key K has been changed. On the other hand, since the data are recorded in scrambled form as described, it will be possible to play them back only on the network of the user who has recorded them.

In FIG. 1, the network is represented in the state in which it is when all the appliances have been plugged in according to the processes which will be described subsequently. FIG. 1 illustrates in particular, for the source device 1 and the receiver device 2, all the keys contained in each device. The keys represented are not necessarily present at every moment in the devices. Typically, the device 1 does not store the public key PUB2 of the device 2 beyond the exchange of symmetric key Kc as described later, while the device 2 does not store the symmetric key Kc beyond the same exchange.

In particular, each receiver device comprises a symmetric network key Kn in a memory. This key is distributed to a receiver appliance newly connected to the network by one of the so-called "progenitor" receiver appliances.

Moreover, each receiver device possesses a pair of asymmetric keys (PRIVx, PUBx), the first key being private and the second public. These keys will be used within the framework of the authentication of the appliances of the network, and for exchanging the symmetric keys.

We shall now describe how the data which are transmitted in the stream F received by the decoder 10 are processed. As is known to the person skilled in the art, in the case of data transmitted according to the MPEG-2 format, the data stream F comprises a succession of video data packets, audio data packets and management data packets. The management data packets comprise in particular control messages denoted ECM ("ECM" standing for "Entitlement Control Message") in which are transmitted, in a form encrypted with the aid of a key K, the control words CW which have served to scramble the data transmitted in the video and audio data packets.

This data stream F is transmitted to the chip card 11 so as to be processed therein. It is received by a demultiplexer module (DEMUX) 12, which module transmits, on the one hand to an access control module (CA) 13 the ECMs and on the other hand to a multiplexing module (MUX) 15, the scrambled video and audio data packets, denoted DE. The CA module contains the key K and can thus decrypt the control words CW which are contained in the ECMs. The CA module transmits these control words CW to a converter module 14 which contains, according to the invention, a symmetric key Kc. The generation of this key and its transmission between the appliances will be seen subsequently.

The converter module 14 uses the symmetric key Kc to encrypt the control words CW and transmit these control words, encrypted with the aid of the symmetric key Kc, to the multiplexing module 15 in control messages denoted LECM. These messages LECM have the same function as the messages ECM received in the initial data stream F, namely to transmit the control words CW, but in the messages LECM, the control words CW are encrypted therein with the aid of the symmetric key Kc instead of being encrypted with the aid of the key K of the service provider.

Preferably, the key Kc is frequently renewed, for example on initiating each data transmission, with the aim of preventing the source device from comprising a long-term secret, which would require enhanced protection.

The multiplexing module 15 then transmits the data packets DE and the converted control messages LECM in a data stream F' which is received by the decoder 10. It is this data stream F' which will then flow around the domestic bus B so as to be received, either by one of the receiver devices 2 or 3, or by the digital video recorder 4 so as to be recorded.

In addition to the transmission of the control words encrypted with the aid of the symmetric key Kc, the source device transmits the key Kc itself to the receiver device, but encrypted with the aid of a key Kn by an algorithm E2, that is to say it transmits E2{Kn}(Kc).

In the remainder of the description, the notation "E{K}(D)" will always be used to signify encryption of data D by an algorithm E with a key K.

The key Kn, which we shall refer to hereinafter as the network key, does not reside in the source appliance, but in the receiver appliance. Following the creation of the key Kc, the latter is transmitted in a secure manner to the receiver appliance, which encrypts it with the aid of Kn and retransmits the result to the source appliance, for subsequent use.

According to the invention, the data therefore always flow in encrypted form in the bus B, and only the appliances having access to the symmetric key Kc are capable of decrypting the control words CW and therefore of decrypting the said data DE. These appliances are those possessing the network key Kn. This therefore prevents the broadcasting to other local networks of any copy made in the domestic network of FIG. 1.

In the example of FIG. 1, the modules 12 to 15 are integrated into the chip card 11 but, in a variant embodiment, it is possible to place the modules DEMUX and MUX in the decoder 10, only the modules 13 and 14 remaining integrated into the chip card. Specifically, since the module CA 13 and the converter module 14 contain decryption and encryption keys, they must be integrated into a secure medium such as a chip card.

The receiver device 2 comprises a digital television receiver (DTV1) 20 fitted with a chip card reader furnished with a chip card 21. The receiver 20 receives the data stream F' originating either from the decoder 10, or from the digital video recorder 4, through the bus B. The data stream F' is transmitted to the chip card 21. It is received by a demultiplexer module (DEMUX) 22, which transmits, on the one hand, the scrambled video and audio data packets DE to a descrambling module (DES.) 24, and, on the other hand, the converted control messages LECM to a terminal module 23, as well as the encrypted key E2{Kn}(Kc).

The terminal module 23 firstly decrypts E2{Kn}(Kc) with the aid of the network key Kn which it possesses, so as to obtain the symmetric key Kc. Then, since the control messages LECM contain the control words CW which have been encrypted with the aid of the key Kc, the terminal module can decrypt these control words with the aid of the key Kc which it has just calculated, so as to obtain the control words CW as plaintext. The control words CW are then transmitted to the descrambling module 24 which uses them to descramble the data packets DE and to output plaintext data packets DC to the television receiver 20.

Advantageously, E2{Kn}(Kc) is included in each of the LECM messages. In this case, the key Kc does not have to be stored by the receiver device for a long period. Moreover, it can be recovered quickly—as quickly as the control words CW—so as to allow fast descrambling of the useful data. This is especially important for helping lock-on when a user hops from station to station ("zapping") or when a new receiver appliance is plugged into the network while a video stream is being transmitted ("hotplugging").

In order to secure the final transmission of the plaintext data DC between the chip card 21 and the display circuits of the television receiver 20, the interface I between the said chip card and the card reader of the receiver 20 is, for example, made secure according to the NRSS American standard (NRSS being the acronym for National Renewable Security Standard) for securing chip cards.

The second receiver device 3, comprising a digital television receiver (DTV2) 30 fitted with a chip card reader furnished with a chip card 31 operates in exactly the same manner as the receiver device 2 and will not be described in greater detail.

By virtue of the local digital network which has just been described, the data stream F originating from a content provider is transformed by the source device which receives it into a data stream F' in which the data (or more precisely the control words CW) are encrypted with a symmetric key Kc. The key Kc is transmitted together with the data encrypted with its aid while itself being encrypted with the aid of another symmetric key, the network key Kn. This data stream F' thus contains data having a format specific to the local network, which data can be decrypted only by the receiver devices of the local network which all contain the network key Kn.

Moreover, since the key Kc is broadcast together with the data (in encrypted form), it can be recorded, for example by the digital video recorder (DVCR) 4, at the same time as the data, thereby allowing subsequent access to the encrypted data.

Additionally, since the network key Kn is not stored in the source devices, the latter therefore do not contain any "long term" secret, requiring increased security precautions.

II] Distribution of the Symmetric Network Key (Kn)

All the receiver devices of the network must possess the symmetric network key (or secret key) Kn. This key is transmitted to a new receiver device by a particular receiver device of the network, the progenitor.

Each receiver device can be in one of the following states: Virgin, Progenitor, Sterile.

A Virgin receiver device is defined by the fact that it does not comprise the symmetric network key Kn. This is typically a device which is not yet linked to the network. This is the default state of a receiver device.

A Sterile device is defined by the fact that it possesses the symmetric network key Kn, but that it cannot transmit it to another device.

A Progenitor device is defined by the fact that it possesses the symmetric network key Kn, and that it can transmit it to other devices of the network. There can exist only one progenitor device in the network.

The state of a device is stored by a state indicator IE which is a 2-bit register located in the terminal module 23 of the receiver device. By convention, it is assumed that when the device is in the virgin state, the state indicator IE is equal to 00; when the device is in the progenitor state, IE=01 and when the device is in the sterile state, IE=10.

The state indicator IE is preferably contained in an integrated circuit in a chip card so as to guarantee its tamperproofing.

During installation of a receiver device, several cases need to be distinguished, as a function, as the case may be, of the state of the receiver devices already existing in the network.

Figure 2:
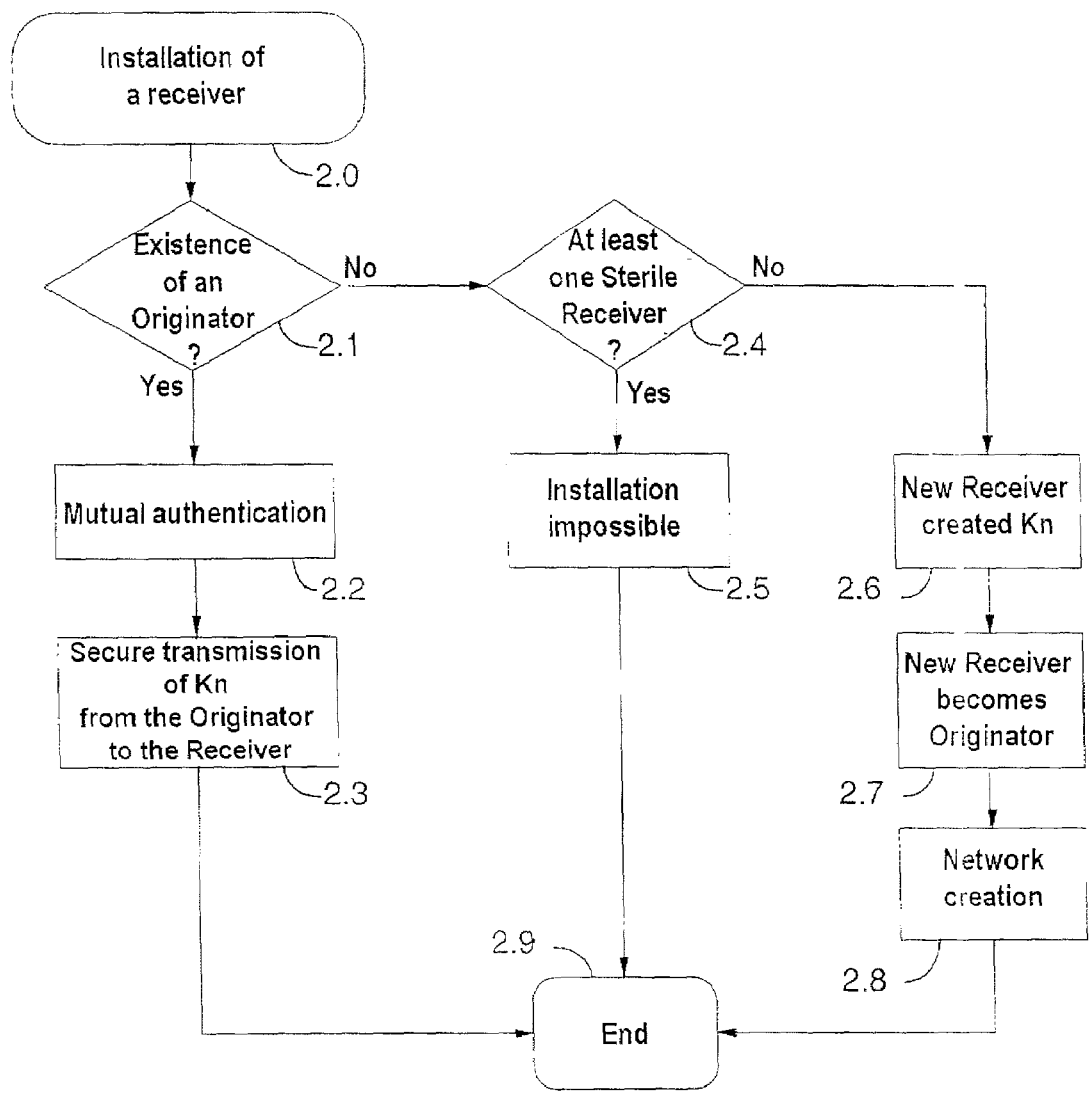
FIG. 2 is a flowchart of the process of installation of a new receiver device in a communication network.

The flowchart of FIG. 2 illustrates the various checks and actions undertaken by the receiver device in the course of installation.

After a first installation step 2.0, the new receiver device checks initially whether there is a Progenitor in the network (step 2.1). If the answer is in the affirmative, a step of authentication of the new receiver and of the Progenitor is carried out (step 2.2), on the initiative of the new receiver. This authentication is based, for example, on the use of pairs of asymmetric keys of the two devices and implements an authentication algorithm known per se to the person skilled in the art. Once this authentication has been carried out, the Progenitor transmits the key Kn to the new receiver (step 2.3) in a secure manner. The latter then takes the Sterile state and modifies its register IE accordingly, thereby terminating installation (step 2.9).

According to a variant embodiment, when a new receiver device is installed and detects the presence of a Progenitor in the network, the new device takes the Progenitor state and forces the previous Progenitor into the Sterile state.

When no Progenitor exists in the network, the new receiver checks whether at least one Sterile receiver exists in the network (step 2.4), although no Progenitor exists. If such is the case, then installation is impossible and the procedure stops (steps 2.5 and 2.9). An error message is transmitted to the user, for example on a display panel of the new receiver. However, even in this case, the existing Sterile devices can receive and decrypt encrypted data from a source device of the network.

Returning to the flowchart of FIG. 2, in the case where The network comprises neither Progenitor nor Sterile device, the new receiver creates a key Kn (step 2.6). This key is typically a 128-bit key, so as to be consistent with the symmetric encryption algorithms currently used (for example the "AES" algorithm, the initials standing for "Advanced Encryption Standard" and also referred to as "Rijndael", described by J. Daemen and V. Rijmen in "*Proceedings from the First Advanced Encryption Standard Candidate Conference, National Institute of Standards and Technology (NIST), August* 1998" or else the algorithm "TwoFish" described in the article "*TwoFish—a Block Encryption Algorithm*" by B. Schneier, J. Kelsey, D. Whiting, D. Wagner, N. Ferguson and published in the same NIST conference report).

The key Kn can be chosen randomly. Once this key has been created, the new receiver proclaims itself as Progenitor and modifies the content of its register IE accordingly (step 2.7). The network of receiver appliances is then created (step 2.8) and the process concludes (step 2.9).

Figure 3:
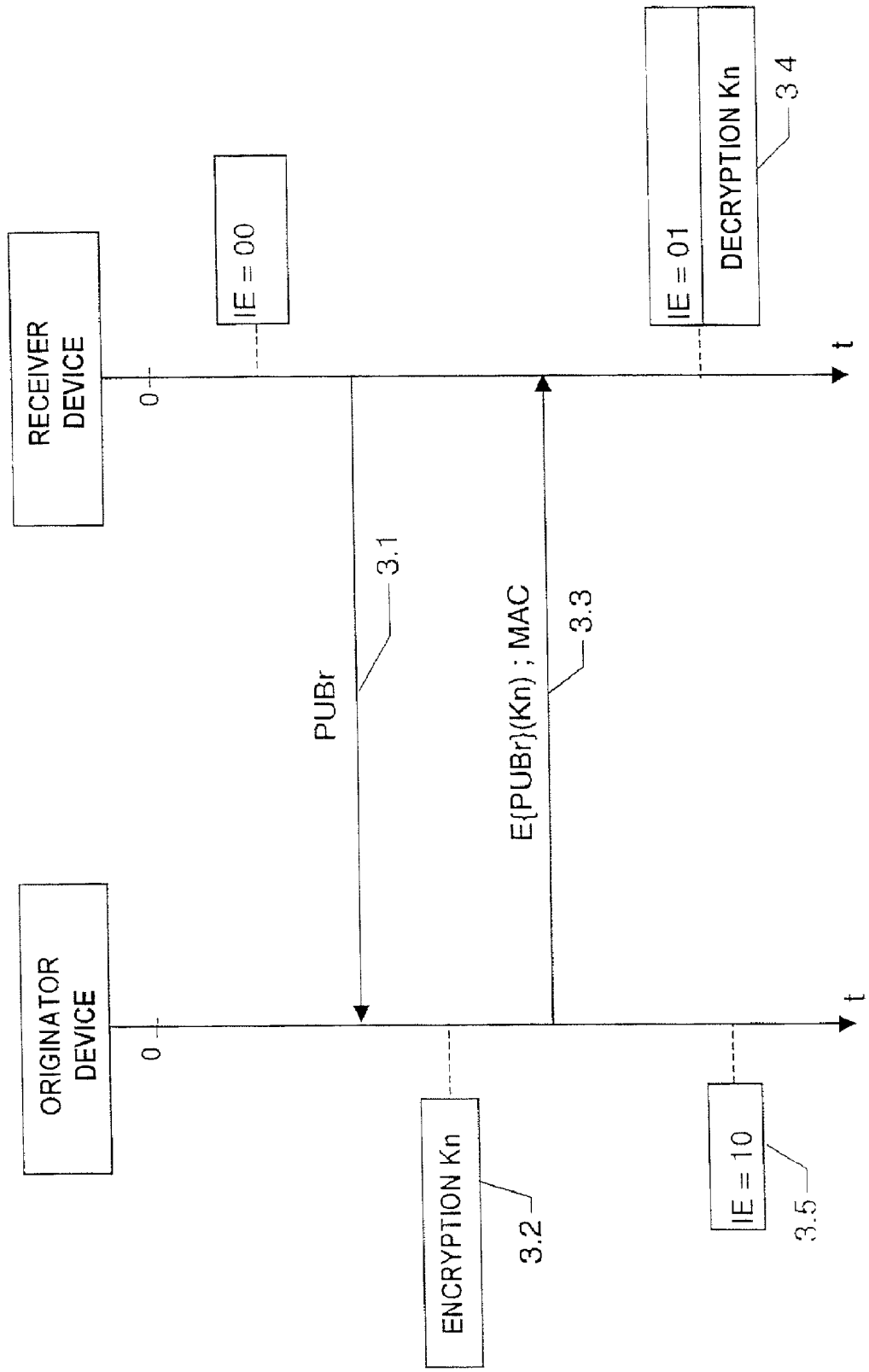
FIG. 3 is a time chart illustrating the exchange of a symmetric network key between a device possessing this key ("Progenitor") and a receiver device undergoing installation into the network.

FIG. 3 is a chart illustrating the exchanges between a new receiver device and a pre-existing Progenitor during installation of the new receiver. So, this chart corresponds to step 2.3 of FIG. 2.

When the new receiver device is installed in the network, the receiver device contains a pair of certified keys, public PUBr and private PRIVr, and is, according to the invention, in the Virgin state (state indicator IE=00). The receiver device initially transmits (step 3.1) its public key PUBr to the Progenitor device. The latter encrypts the key Kn with the aid of the public key PUBr (step 3.2), and transmits the result of the encryption to the receiver device (step 3.3). The latter decrypts these data with the aid of its private key PRIVr (step 3.4) and thus recovers the key Kn. The receiver device then becomes the new Progenitor of the network (its register IE goes to the 01 state) and the former Progenitor device now becomes Sterile (register IE=10) in step 3.5.

To guarantee the integrity and the origin of the key Kn, the Progenitor generates a message authentication code ("MAC") on the basis of this key and by way of a known algorithm. This code is sent together with the encrypted data E{PUBr}(Kn) in step 3.3. It is checked by the receiver in step 3.4. The algorithm "HMAC-SHA-1" (standing for "Keyed-Hash Message Authentication Code") is an example of an algorithm which can be used within this framework III] Exchange of the Short-term Symmetric Key and Encryption of the Data Let us assume that the new receiver device which has just been installed and rendered possessor of the symmetric network key Kn according to the process described above is the receiver device 2 of FIG. 1. This device is therefore kept ready to receive data from the source device 1.

Figure 4:
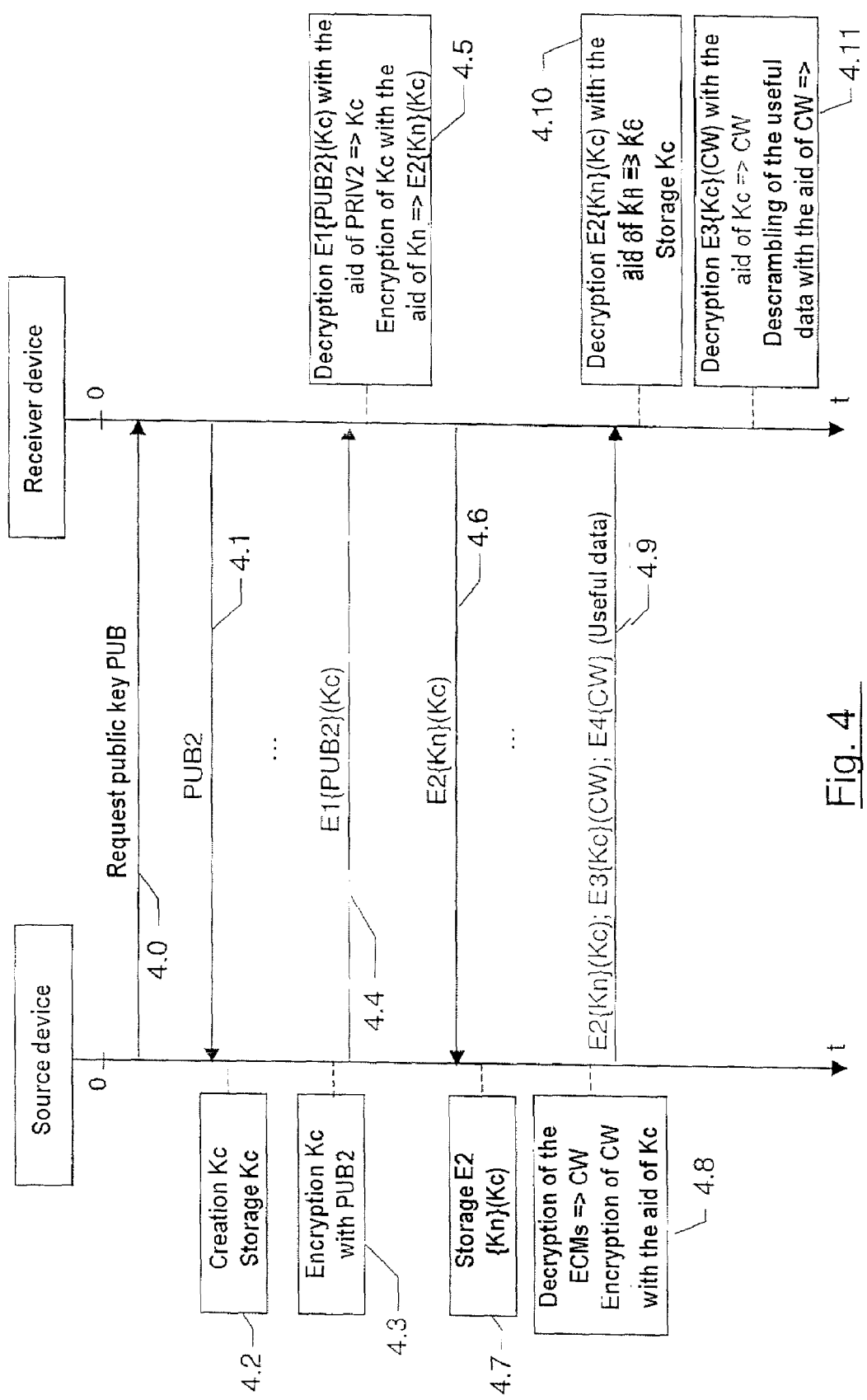
FIG. 4 is a time chart illustrating the communications between a source device sending encrypted data and a receiver device receiving the said data, the communication implementing the symmetric keys according to the present exemplary embodiment.

FIG. 4 illustrates the messages exchanged in this regard.

Initially (step 4.0), the source device 1 issues a request over the network, asking for transmission of the public key PUBx to any receiver device. All the receiver devices present on the network at that moment respond by sending back their public key. We will assume in what follows that the first key received by the source device 1 is the public key PUB2 sent in the course of step 4.1 by the receiver device 2. The source device takes into account the first message received and will then correspond with the corresponding receiver device.

The source device creates and then stores the "short-term" symmetric key Kc (step 4.2), which key will serve to encrypt the control words CW. This symmetric key is, according to the present exemplary embodiment, chosen randomly and preferably possesses a length of 128 bits. The key Kc is encrypted with the aid of the public key PUB2 by way of an asymmetric encryption algorithm E1, for example the "RSA OAEP" algorithm (standing for "Rivest, Shamir, Adleman Optimal Asymmetric Encryption Padding"—described in *PKCS#1: RSA Cryptography Specifications, version* 2.0 (October 1998)), then transmitted in encrypted form E1{PUB2} (Kc) to the receiver device (step 4.4). The latter decrypts the key Kc with the aid of its private key PRIV2, encrypts it again according to a symmetric encryption algorithm E2 with the aid of the symmetric network key Kn (step 4.5) and sends Kc thus encrypted (i.e. E2{Kn}(Kc)) back to the source device (step 4.6), which stores this information item (step 4.7).

It will be noted that the source device does not know the secret key Kn.

According to the present exemplary embodiment, the key Kc is created during the initialization of a connection between the source device and the receiver device. Kc can be created well before the implementation of the connection. Kc can also be modified one or more times during connection. In this case, steps 4.0 to 4.7, which are essentially aimed at obtaining from a receiver device of the network the encryption of the key Kc by the network key Kn, need to be repeated.

Steps 4.8 to 4.11 relate to the transmission of useful data.

The data received by the source device 1 comprise messages ECM. The source device decrypts the latter so as to extract therefrom the control words CW, then it encrypts the control words CW with the aid of the symmetric key Kc by way of a symmetric encryption algorithm E3 (step 4.8). The source device then reinserts these encrypted control words (i.e. E3{Kc}(CW)) into the data stream and transmits the whole over the bus B heading for the receiver device or devices (step 4.9). Also during step 4.9, the source device sends the key Kc encrypted with the aid of Kn which it had previously stored in step 4.7.

It will also be noted that the useful data transmitted in step 4.9 are encrypted according to a symmetric encryption algorithm E4 with the aid of the control words CW.

The receiver devices can decrypt E2{Kn}(Kc) with the aid of Kn (step 4.10) and, possessing Kc, can access the control words CW and thus descramble the useful data (step 4.11).

The algorithms E2, E3 and E4 can be identical or different. It will, for example, be possible to use the AES algorithm or the TwoFish algorithm which have already been cited.

Transmitting Kc encrypted with the aid of the symmetric network key Kn implies that only the receiver devices of the network can access Kc. Moreover, several receiver devices can simultaneously decode the data sent.

During the creation of a key Kc, it is necessary for at least one receiver device installed in the manner described to reside in the network in order to transmit the key Kc encrypted with the network key Kn to the source device which has generated this key Kc. However, the data transmitted by the source device and encrypted at least partially with the aid of this key may very well be intended for another appliance of the network, such as a recorder appliance, which would not necessarily possess the function of decryption of the data which it records.

According to a variant of the exemplary embodiment, the source device stores several keys Kc encrypted with the aid of the network key Kn, with the corresponding keys Kc, in anticipation of forthcoming data transmissions.

Although, according to the present example, it is essentially the control words CW which are decrypted by the source device and encrypted again with the aid of the symmetric key Kc, the invention is plainly not limited to this example. In particular, other data may be decrypted, then encrypted again with the aid of this key. Moreover, certain data may be encrypted with the aid of the symmetric key without, however, having been decrypted previously by the source device. In this latter case, it is necessary to think about making the key K (required in order to decrypt the first encryption carried out) available in a secure manner to the receiver devices.

Finally, the data to be encrypted by the source device may reach it in unencrypted form.

Additionally, the invention is not limited to the transmission of audio/video data. Data of any type may be transmitted in the manner set forth.

The invention claimed is:

1. Process of symmetric key management in a communication network comprising:
   a device of a first type furnished with a source of data to be broadcast over the network and
   at least one device of a second type intended to receive said data, the process comprising the steps of:
   (a) by the device of the first type, determination of a first symmetric key, encryption of the first symmetric key to produce an encrypted first symmetric key, and transmission of the encrypted first symmetric key to said at least one device of the second type;
   (b) by said at least one device of the second type, reception of the encrypted first symmetric key, decryption of the encrypted first symmetric key to recover the first symmetric key, encryption of said first symmetric key with the aid of a second symmetric key to produce a second symmetric key encrypted first symmetric key, said second symmetric key known to the said at least one device of the second type of the network, and transmission of said second symmetric key encrypted first symmetric key to the device of the first type;

(c) by the device of the first type, reception and storage of said second symmetric key encrypted first symmetric key.

2. Process according to claim 1, furthermore comprising the steps of:

(d) by the device of the first type, encryption, with the aid of the first symmetric key, of data to be transmitted to said at least one device of the second type;

(e) by the device of the first type, transmission of the encrypted data and of said second symmetric key encrypted first symmetric key to said at least one device of the second type;

(f) by said at least one device of the second type, decryption of the second symmetric key encrypted first symmetric key encrypted by said at least one device of the second type with the aid of the second symmetric key to recover said first symmetric key, and decryption of the encrypted data with the aid of the first symmetric key thus recovered.

3. Process according to claim 1, wherein the device of the first type stores in parallel a plurality of non-encrypted first symmetric keys and of encrypted first symmetric keys corresponding to the non-encrypted first symmetric keys.

4. Process according to claim 1, wherein the first symmetric key is renewed at least once during the transmission of a new series of data.

5. Process according to claim 1, furthermore comprising a phase of installation of a new device of the second type in the network, the phase of installation comprising the step of verification of the presence of a device of the second type existing in the network, possessing the second symmetric key, and having the capacity to transmit it securely and, responsive to a result of the verification step in the affirmative, the step of transmission of the second symmetric key to the new device of the second type, and responsive to a result of the verification step in the negative, the step of generation of the second symmetric key by the new device of the second type.

6. Communication device suitable for being connected to a communication network, said device comprising:

means for encryption of decrypted data;

wherein the encryption means employs an encryption algorithm implementing a first symmetric key and wherein the device furthermore comprises:

means for reception from a receiver device linked to the network the first symmetric key encrypted with the aid of a second symmetric key known to all receiver devices linked to the network;

means of storing the first symmetric key encrypted with the aid of the second key; and means of transmission over the network to at least one receiver device of the data encrypted with the aid of the encryption means together with the first symmetric key encrypted with the aid of the second key.

7. Device according to claim 6, furthermore comprising means of decryption of data originating from a source of encrypted data.

8. Device according to claim 6, wherein the second key is symmetric.

9. Device of a given type for processing data in a communication network, comprising:

means of decryption of an encrypted first symmetric key received from an appliance of the network, encryption of the first symmetric key having been carried out with the aid of a second symmetric key;

a memory for storing the second symmetric key, which is known to all devices of the given type of the network;

means of decryption of encrypted data received from the network with the aid of the first symmetric key; and means for encryption of a first symmetric key received from the appliance in the network, the encryption being carried out with the aid of the second symmetric key;

means for sending the encrypted first symmetric key supplied by said means for encryption to the appliance in the network.

10. Device according to claim 9, further comprising means of descrambling data received from the network, said descrambling means using the result of the data decryption carried out with the aid of the first symmetric key.

11. Device according to claim 9, wherein the memory furthermore comprises a pair of asymmetric keys for the secure transmission, to said device, of the first symmetric key.

12. Process of symmetric key management in a communication network by a device of a first type furnished with a source of data to be broadcast over the network, the network also comprising at least one device of a second type intended to receive said data, the process comprising:

determining a first symmetric key to be used for transmitting data to at least one device of the second type;

encrypting the first symmetric key;

transmitting the encrypted first symmetric key to at least one device of the second type;

receiving, from the at least one device of the second type, the first symmetric key that has been encrypted with the aid of a second symmetric key to produce thereby a second symmetric key encrypted first symmetric key, said second symmetric key known to said at least one device of the second type;

storing the second symmetric key encrypted first symmetric key.

13. Process according to claim 12, furthermore comprising:

encrypting, with the first symmetric key, data to be transmitted to the at least one device of the second type; and transmitting the encrypted data and the encrypted first symmetric key to the at least one device of the second type.

14. Process according to claim 12, further comprising:

storing in parallel a plurality of non-encrypted first symmetric keys and of encrypted first symmetric keys corresponding to the non-encrypted first symmetric keys.

15. Process according to claim 14, wherein the first symmetric key is renewed at least once during the transmission of a new series of data.

* * * * *

UNITED STATES PATENT AND TRADEMARK OFFICE
Certificate

Patent No. 7,403,622 B2                                                                          Patented: July 22, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Eric Diehl, Liffré (FR); Jean-Pierre Andreaux, Rennes (FR); and Alain Durand, Rennes (FR).

Signed and Sealed this Twenty-sixth Day of October 2010.

<div style="text-align: right;">
TOD SWANN<br>
*Supervisory Patent Examiner*<br>
Art Unit 2403<br>
Technology Center 2400
</div>